United States Patent [19]

Challier et al.

[11] 3,853,880
[45] Dec. 10, 1974

[54] PYRROLO (3,4-B) PYRIDINE DERIVATIVES

[75] Inventors: Jean-Louis Challier, Thiais; Claude Jeanmart, Brunoy; Mayer Naoum Messer, Bievres, all of France

[73] Assignee: Rhone-Poulenc S.A., Paris, France

[22] Filed: Oct. 19, 1972

[21] Appl. No.: 299,167

[30] Foreign Application Priority Data
Oct. 22, 1971 France .............................. 71.38045

[52] U.S. Cl.... 260/268 BC, 260/268 C, 260/290 R, 424/250
[51] Int. Cl............................................. C07d 51/70
[58] Field of Search.................. 260/268 BC, 268 C

[56] References Cited
UNITED STATES PATENTS
3,100,776  8/1963  Poos ............................ 260/268 BC
3,198,798  8/1965  Zenetz et al. ................. 260/268 BC
3,635,976  1/1972  Shetty .......................... 260/268 BC Primary Examiner—Richard J. Gallagher
Assistant Examiner—Mary C. Vaughn
Attorney, Agent, or Firm—Stevens, Davis, Miller & Mosher

[57] ABSTRACT

Compounds of the formula:

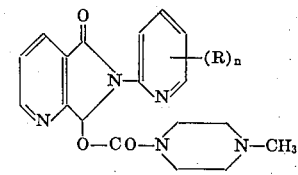

wherein R represents halogen, alkyl or alkoxy of one through four carbon atoms, or cyano or nitro, and $n$ represents 0 or an integer from 1 to 4, are new therapeutically useful compounds, particularly active as tranquilizers and anti-convulsant agents.

4 Claims, No Drawings

PYRROLO (3,4-B) PYRIDINE DERIVATIVES

This invention relates to new therapeutically useful pyrrolo[3,4-b]pyridine derivatives, to processes for their preparation and pharmaceutical compositions containing them.

The new pyrrolo[3,4-b]pyridine derivatives of the present invention are those of the general formula:

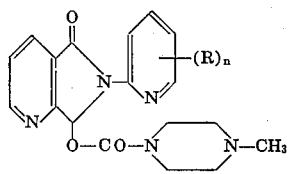

I (wherein R represents a halogen atom, or an alkyl or alkoxy radical, each radical containing one to four carbon atoms, or a cyano or nitro radical, and $n$ represents 0 or an integer from 1 to 4) and acid addition salts thereof. When the symbol $n$ represents 2, 3 or 4 it is to be understood that the atoms or radicals present on the pyridyl ring may be the same or different.

According to a feature of the invention, the compounds of general formula I are prepared by the process which comprises reacting 1-chlorocarbonyl-4-methylpiperazine with an alkali metal salt, optionally prepared in situ, of a 5,6-dihydropyrrolo-[3,4-b]pyridine derivative of the general formula:

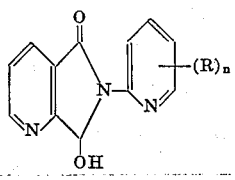

II wherein R and $n$ are as hereinbefore defined. The reaction is generally carried out in an anhydrous inert organic solvent, for example dimethylformamide, at a temperature below 50°C., preferably at 20°–35°C.

The 5,6-dihydropyrrolo[3,4-b]pyridine derivatives of general formula II can be obtained by the partial reduction of a quinolinimide derivative of the general formula:

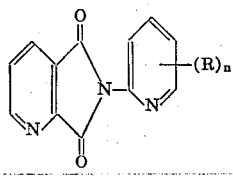

III wherein R and $n$ are as hereinbefore defined. The reduction is generally carried out by means of an alkali metal borohydride in aqueous alcoholic solution.

The quinolinimide derivatives of general formula III can be obtained by reacting a 2-aminopyridine of the general formula:

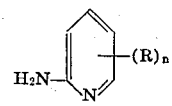

IV (wherein R and $n$ are as hereinbefore defined) with quinolinic anhydride.

According to another feature of the invention, the compounds of general formula I are prepared by the process which comprises reacting 1-methylpiperazine with a mixed carbonate of the general formula:

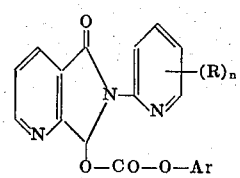

V wherein Ar represents a phenyl radical optionally substituted by, for example, an alkyl radical containing one to four carbon atoms, and R and $n$ are as hereinbefore defined. The reaction is generally carried out in an inert organic solvent, for example acetonitrile, at a temperature of 10°–35°C.

The mixed carbonates of general formula V can be obtained by reacting a chloroformate of the general formula:

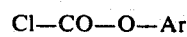

Cl—CO—O—Ar

VI (wherein Ar is as hereinbefore defined) with a 5,6-dihydropyrrolo[3,4-b]pyridine derivative of general formula II. The reaction is generally carried out in a basic organic solvent, for example pyridine, at a temperature below 10°C.

The pyrrolo[3,4-b]pyridine derivatives of general formula I obtained by the aforementioned processes can be purified by physical methods such as distillation, crystallisation or chromatography, or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The pyrrolo[3,4-b]pyridine derivatives of general formula I may be converted by methods known per se into acid addition salts. The acid addition salts may be obtained by the action of acids on the new compounds in appropriate solvents. As organic solvents there may be used alcohols, ethers, ketones or chlorinated hydrocarbons. The salt which is formed is precipitated, if necessary after concentration of the solution, and is isolated by filtration or decantation.

The pyrrolo[3,4-b]pyridine derivatives of the invention and their acid addition salts possess valuable pharmacological properties; they are particularly active as tranquillisers and anti-convulsant agents. In animals (mice) they have proved active as such at doses of between 5 and 200 mg./kg. animal body weight when administered orally, in particular in the following tests:

i. electric battle test according to a technique similar to that of Tedeschi et al [J. Pharmacol., 125, 28 (1959)],
ii. convulsion with pentetrazole according to a technique similar to that of Everett and Richards [J. Pharmacol., 81, 402 (1944)], iii. supramaximal electroshock according to the technique of Swinyard et al [J. Pharmacol., 106 319 (1952)], and iv. locomotor activity according to the technique of Courvoisier [Congres de Medecins Alienistes et Neurologistes - Tours - (8/13th June, 1959)] and Julou (Bulletin de la Societe de Pharmacie de Lille, No. 2, January, 1967, page 7).

Preferred pyrrolo[3,4-b]pyridine derivatives of the invention are those of general formula I wherein n represents 1 and the substituent R is in the 5-position of the pyridyl ring, and more particularly those compounds wherein R represents a halogen (preferably chlorine) atom, an alkyl radical containing one to four carbon atoms, or a cyano radical, and acid addition salts thereof.

For therapeutic purposes, the pyrrolo[3,4-b]-pyridine derivatives of general formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllinacetates, salicylates, phenolphthalinates and methylene-bis-$\beta$-hydroxynaphthoates) so that the beneficial physiological properties inherent in the bases are not vitiated by side effects ascribable to the anions.

The following Examples illustrate the invention.

EXAMPLE 1

A slight suspension of 5-oxo-6-(5-chloropyrid-2-yl)-7-hydroxy-5,6-dihydropyrrolo[3,4-b]pyridine (6 g.) in anhydrous dimethylformamide (150 cc.) is added, over the course of 45 minutes, to a suspension of sodium hydride (54% dispersion in mineral oil) (1.22 g.) in anhydrous dimethylformamide (10 cc.), whilst maintaining the temperature at about 20°C. When the evolution of gas has ceased, 1-chlorocarbonyl-4-methylpiperazine (4.15 g.) is added slowly whilst maintaining the temperature between 25° and 30°C. The reaction mixture is stirred for a further 5 hours at a temperature of about 20°C. and is then left to stand overnight. The reaction mixture is then poured into ice-water (1,000 cc.). After addition of methylene chloride (250 cc.), the organic layer is separated and the aqueous phase is extracted with methylene chloride (3 × 250 cc.). The organic fractions are combined, washed with water (2 × 100 cc.) and dried over anhydrous sodium sulphate (50 g.). After filtration and concentration under reduced pressure, an oil is obtained which, on trituration with diisopropyl ether (150 cc.), yields a solid product (6.7 g.). On recrystallisation of the product from a mixture of acetonitrile (30 cc.) and diisopropyl ether (70 cc.), 5-oxo-6-(5-chloropyrid-2-yl)-7-(4-methylpiperazin-1-yl)carbonyloxy-5,6-dihydropyrrolo[3,4-b]-pyridine (5.2 g.), melting at 142°C., is obtained.

5-Oxo-6-(5-chloropyrid-2-yl)-7-hydroxy-5,6-dihydropyrrolo[3,4-b]pyridine employed as starting material can be prepared by adding a solution of potassium borohydride (3 g.) in distilled water (30 cc.) and N sodium hydroxide solution (3 cc.) to a suspension of N-(5-chloropyrid-2-yl)-quinolinimide (19 g.) in methanol (100 cc.), over the course of 25 minutes, with stirring and whilst keeping the temperature at 10°C. After stirring for 3 hours at about 30°C., the crystals which have formed are filtered off, dried and then washed with boiling acetone (100 cc.). A white solid product (13 g.) is thus obtained; after recrystallisation from a mixture of dimethylformamide (240 cc.) and distilled water (120 cc.), 5-oxo-6-(5-chloropyrio-2-yl)-7-hydroxy-5,6-dihydropyrrolo[3,4-b]pyridine (6.7 g.), melting at 236°–238°C., is obtained.

N-(5-Chloropyrid-2-yl)-quinolinimide can be obtained by heating a mixture of quinolinicanhydride (18 g.) and 2-amino-5-chloropyridine (28 g.) in acetic anhydride (30 cc.) for 3 hours at 120°C., with stirring. The mass obtained is triturated with ethanol (50 cc.) and, after filtration, gives a white solid product (33.7 g.) which is treated with boiling ethanol (200 cc.). A hot filtration removes the insoluble material. N-(5-Chloropyrid-2-yl)-quinolinimide (19.8 g.), melting at 203°–204°C., is thus obtained.

Quinolinic anhydride can be prepared according to the method described by F. F. Blicke and E. L. Jenner [J. Amer. Chem. Soc., 64, 1741 (1942)].

EXAMPLE 2

A slight suspension of 5-oxo-6-(5-methylpyrid-2-yl)-7-hydroxy-5,6-dihydropyrrolo[3,4-b]pyridine (12.8 g.) in anhydrous dimethylformamide (300 cc.) is added, over the course of 20 minutes, to a suspension of sodium hydride (54% dispersion in mineral oil) (2.8 g.) in anhydrous dimethylformamide (20 cc.), whilst keeping the temperature at about 25°C. When the evolution of gas has ceased, 1-chlorocarbonyl-4-methylpiperazine (9.4 g.) is added slowly, whilst maintaining the temperature at about 25°C. The reaction mixture is stirred for a further 4 hours at a temperature of about 20°C. and is then left to stand overnight. The reaction mixture is then poured into ice-water (2,300 cc.). Methylene chloride (250 cc.) is added, the organic layer is separated and the aqueous phase is extracted with methylene chloride (2 × 250 cc.), The organic fractions are combined and dried over anhydrous sodium sulphate. After filtration and concentration under reduced pressure, a suspension is obtained which, on addition of diisopropyl ether (100 cc.), yields a solid product (15.1 g.). On recrystallisation of the product from acetonitrile (120 cc.), 5-oxo-6-(5-methylpyrid-2-yl)-7-(4-methylpiperazin-1-yl)carbonyloxy-5,6-dihydropyrrolo[3,4-b]-pyridine (13.3 g.), melting at 193°C., is obtained.

5-Oxo-6-(5-methylpyrid-2-yl)-7-hydroxy-5,6-dihydropyrrolo[3,4-b]pyridine employed as starting material can be prepared by adding a solution of potassium borohydride (3.2 g.) in distilled water (32 cc.) and N sodium hydroxide solution (3.2 cc.) to a suspension of N-(5-methylpyrid-2-yl)-quinolinimide (18.7 g.) in methanol (95 cc.), over the course of 25 minutes, with stirring and whilst maintaining the temperature between 15° and 20°C. After stirring for 4 hours at about 25°C., the crystals which have formed are filtered off and dried. 5-Oxo-6-(5-methylpyrid-2-yl)-7-hydroxy-5,6-dihydropyrrolo[3,4-b]-pyridine (11.6 g.), melting at 226°C., is thus obtained.

N-(5-Methylpyrid-2-yl)-quinolinimide can be obtained by heating a mixture of quinolinic anhydride (15 g.) and 2-amino-5-methylpyridine (19.8 g.) in acetic anhydride (24.5 cc.) for 4 hours at 120°C., with stirring. The reaction mixture becomes solid on cooling. Ethanol (50 cc.) is then added and the resulting crystals are filtered off to yield N-(5-methylpyrid-2-yl)-quinolinimide (22 g.) melting at 179°C.

EXAMPLE 3

1-Methylpiperazine (1.6 g.) is reacted with 5-oxo-6-(5-methylpyrid-2-yl)-7-phenoxycarbonyloxy-5,6-dihydropyrrolo[3,4-b]pyridine (2.9 g.) for 16 hours at 20°C. in acetonitrile (20 cc.). The crystals which have formed are filtered off to yield a solid product (2 g.) melting at 190°C. On recrystallisation of the solid product from acetonitrile (22 cc.), 5-oxo-6-(5-methylpyrid-2-yl)-7-(4-methylpiperazin-1-yl)-carbonyloxy-5,6-dihydropyrrolo[3,4-b]pyridine (1.6 g.), melting at 193°C., is obtained.

5-Oxo-6-(5-methylpyrid-2-yl)-7-phenoxycarbonyloxy-5,6-dihydropyrrolo[3,4-b]pyridine employed as starting material can be prepared by reacting phenyl chloroformate (2.35 g.) with 5-oxo-6-(5-methylpyrid-2-yl)-7-hydroxy-5,6-dihydropyrrolo[3,4-b]pyridine (2.41 g.) in anhydrous pyridine (50 cc.) at 6°C. for 1 hour. The reaction mixture is then poured into water (300 cc.) and the resulting suspension is filtered to yield 5-oxo-6-(5-methylpyrid-2-yl)-7-phenoxycarbonyloxy-5,6-dihydropyrrolo[3,4-b]pyridine (3.42 g.) melting at 136°C.

EXAMPLE 4

1-Methylpiperazine (10.4 g.) is added, with stirring and at a temperature of about 20°C., to a suspension of 5-oxo-6-(5-cyanopyrid-2-yl)-7-phenoxycarbonyloxy-5,6-dihydropyrrolo[3,4-b]pyridine (19.4 g.) in acetonitrile (100 cc.). After slow dissolution, a precipitate appears. Stirring is continued for 16 hours at 20°C. The reaction mixture is then poured into water (850 cc.) and extracted with methylene chloride (3 × 250 cc.). The organic extracts are dried over anhydrous sodium sulphate in the presence of decolourising charcoal (3 g.). After filtration and concentration at 40°C. under reduced pressure (30 mm.Hg), a solid product (17.8 g.), melting at about 130°C., is obtained which yields, after recrystallisation from ethyl acetate (240 cc.), 5-oxo-6-(5-cyanopyrid-2-yl)-7-(4-methylpiperazin-1-yl)carbonyloxy-5,6-dihydropyrrolo[3,4-b]pyridine (10.2 g.) melting at 183°C.

5-Oxo-6-(5-cyanopyrid-2-yl)-7-phenoxycarbonyloxy-5,6-dihydropyrrolo[3,4-b]pyridine employed as starting material can be prepared by reacting phenyl chloroformate (12.3 g.) with 5-oxo-6-(5-cyanopyrid-2-yl)-7-hydroxy-5,6-dihydropyrrolo[3,4-b]pyridine (13.2 g.) in anhydrous pyridine (275 cc.) at 6°C. for 30 minutes. The reaction mixture is stirred for 16 hours at about 20°C. and is then poured into water (1,400 cc.). The resulting suspension is filtered to yield 5-oxo-6-(5-cyanopyrid-2-yl)-7-phenoxycarbonyloxy-5,6-dihydropyrrolo[3,4-b]pyridine (19.4 g.) melting at 170°C.

5-Oxo-6-(5-cyanopyrid-2-yl)-7-hydroxy-5,6-dihydropyrrolo[3,4-b]pyridine can be prepared by adding zinc powder (85 g.) in small portions to a suspension of N-(5-cyanopyrid-2-yl)-quinolinimide (59.1 g.) in acetic acid (591 cc.) at about 20°C., with stirring. After filtration, the resulting solid is taken up in boiling dimethylformamide (200 cc.). The mixture is filtered whilst hot, cooled and then water (5,000 cc.) is added to it. The crystals which have formed are filtered off to yield 5-oxo-6-(5-cyanopyrid-2-yl)-7-hydroxy-5,6-dihydropyrrolo[3,4-b]pyridine (15.3 g.) melting at 279°–280°C.

N-(5-Cyanopyrid-2-yl)-quinolinimide can be prepared by reacting 2-amino-5-cyanopyridine (80.5 g.) with quinolinic anhydride (50.5 g.) in acetic anhydride (96 cc.). The reaction mixture is heated for 3 hours at 135°C. and then cooled and poured into ethanol (200 cc.). The resulting suspension is filtered, and the solid residue is taken up in boiling ethanol (2,500 cc.). There is partial dissolution and the insoluble material is removed by a hot filtration. After drying, N-(5-cyanopyrid-2-yl)-quinolinimide (73.8 g.), melting at 231°C. is obtained.

2-Amino-5-cyanopyridine can be prepared according to the method described by P. Z. Gregory et al, J. Chem. Soc., 87 (1947).

The present invention includes within its scope pharmaceutical compositions comprising, as active ingredient, at least one of the compounds of general formula I, or a non-toxic acid addition salt thereof, in association with a pharmaceutical carrier or coating. The invention includes especially such preparations made up for oral, parenteral or rectal administration, or as ointments.

Solid compositions for oral administration include tablets, pills, powders and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water or liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition or diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult should generally give doses between 50 mg. and 500 mg. of active substance per day. In general the physician will decide the posology considered appropriate, taking into account the age and weight and other factors intrinsic to the patient being treated.

The following Example illustrate pharmaceutical compositions according to the invention.

EXAMPLE 5

Tablets containing 25 mg. of active product and having the following composition are prepared in accordance with the usual technique:

| | |
|---|---|
| 5-oxo-6-(5-chloropyrid-2-yl)-7-(4-methylpiperazin-1-yl)carbonyloxy-5,6-dihydropyrrolo[3,4-b]pyridine | 0.025 g. |
| starch | 0.090 g. |
| precipitated silica | 0.030 g. |
| magnesium stearate | 0.005 g. |

We claim:
1. A pyrrolo[3,4-b]pyridine of the formula:

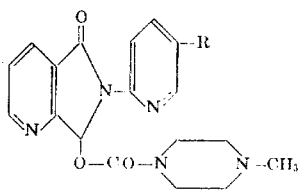

wherein R represents halogen, alkyl of one through four carbon atoms, or cyano, and non-toxic acid addition salts thereof.

2. The pyrrolo[3,4-b]pyridine according to claim 1 which is 5-oxo-6-(5-chloropyrid2-yl)-7-(4-methylpiperazin-1-yl)carbonyloxy-5,6-dihydropyrrolo[3,4-b]pyridine, and non-toxic acid addition salts thereof.

3. The pyrrolo[3,4-b]pyridine according to claim 1 which is 5-oxo-6-(5-methylpyrid-2-yl)-7-(4-methylpiperazin-1-yl)carbonyloxy-5,6-dihydropyrrolo[3,4-b]pyridine, and non-toxic acid addition salts thereof.

4. The pyrrolo[3,4-b]pyridine according to claim 1 which is 5-oxo-6-(5-cyanopyrid-2-yl)-7-(4-methylpiperazin-1-yl)carbonyloxy-5,6-dihydropyrrolo[3,4-b]pyridine, and non-toxic acid addition salts thereof.

* * * * *